US011447029B2

(12) United States Patent
Lee et al.

(10) Patent No.: US 11,447,029 B2
(45) Date of Patent: Sep. 20, 2022

(54) FAULT DETECTION AND MONITORING METHODS FOR SAFE OPERATION OF A WEVC SYSTEM

(71) Applicant: WiTricity Corporation, Watertown, MA (US)

(72) Inventors: Joshua Lee, Munich (DE); Edward van Boheemen, Glen Innes (NZ); Nicholas Athol Keeling, Benway Lodge (AU)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 17/314,966

(22) Filed: May 7, 2021

(65) Prior Publication Data

US 2021/0261012 A1 Aug. 26, 2021

Related U.S. Application Data

(63) Continuation of application No. 16/246,253, filed on Jan. 11, 2019, now Pat. No. 11,001,159.

(Continued)

(51) Int. Cl.
*B60L 53/65* (2019.01)
*B60L 53/30* (2019.01)
(Continued)

(52) U.S. Cl.
CPC .............. *B60L 53/65* (2019.02); *B60L 53/12* (2019.02); *B60L 53/124* (2019.02); *B60L 53/32* (2019.02);
(Continued)

(58) Field of Classification Search
CPC .......... B60L 53/65; B60L 53/12; B60L 53/32; B60L 53/124; B60L 53/30; H02J 50/80;
(Continued)

(56) References Cited

U.S. PATENT DOCUMENTS 6,301,128 B1 10/2001 Jang et al.
2005/0285445 A1 12/2005 Wruck et al.
(Continued)

FOREIGN PATENT DOCUMENTS

GB 2546787 2/2017
WO 2019164779 8/2019

OTHER PUBLICATIONS

"Corrected Notice of Allowance", U.S. Appl. No. 16/246,253, dated Dec. 9, 2020, 2 pages.
(Continued)

*Primary Examiner* — Robert L Deberadinis
(74) *Attorney, Agent, or Firm* — Colby Nipper PLLC

(57) ABSTRACT

A wireless electric vehicle charging system comprises base-side equipment for generating a magnetic field and vehicle-side equipment for receiving energy via the magnetic field to supply power to a vehicle-driving battery. Monitoring circuitry monitors one or more of voltage, current, or phase associated with the base-side equipment and halts generation of the magnetic field in response to a change in the voltage, current, or phase associated with the operation of the base-side equipment that indicates a fault condition at the vehicle-side equipment, which may include a loss of power or disconnection of a battery. Based on detection of the change, the monitoring circuitry can halt generation of the magnetic field to prevent damage at the vehicle-side equipment.

20 Claims, 10 Drawing Sheets

Related U.S. Application Data

(60) Provisional application No. 62/632,825, filed on Feb. 2, 2018.

(51) Int. Cl.

| | | |
|---|---|---|
| *H02J 7/00* | (2006.01) |
| *B60L 53/124* | (2019.01) |
| *H02J 50/60* | (2016.01) |
| *H02J 50/12* | (2016.01) |
| *H02M 1/42* | (2007.01) |
| *H02J 50/80* | (2016.01) |
| *H01M 10/44* | (2006.01) |
| *H02J 50/40* | (2016.01) |
| *H02H 3/18* | (2006.01) |
| *H02J 50/10* | (2016.01) |
| *B60L 53/12* | (2019.01) |
| *H02H 7/125* | (2006.01) |
| *H02H 3/44* | (2006.01) |
| *H02H 3/20* | (2006.01) |

(52) U.S. Cl.
CPC .............. *H01M 10/44* (2013.01); *H02H 3/18* (2013.01); *H02H 7/125* (2013.01); *H02J 7/0029* (2013.01); *H02J 7/0047* (2013.01); *H02J 50/10* (2016.02); *H02J 50/12* (2016.02); *H02J 50/40* (2016.02); *H02J 50/60* (2016.02); *H02J 50/80* (2016.02); *H02M 1/42* (2013.01); *H02H 3/20* (2013.01); *H02H 3/44* (2013.01)

(58) Field of Classification Search
CPC .. H02J 50/10; H02J 50/12; H02J 50/40; H02J 50/60; H02J 7/0029; H02J 7/0047; H01M 10/44; H01M 7/00; H02H 3/18; H02H 7/125; H02H 3/20; H02H 3/44; H02M 1/42

See application file for complete search history.

(56) References Cited

U.S. PATENT DOCUMENTS

| | | |
|---|---|---|
| 2010/0141042 A1 | 6/2010 | Kesler et al. |
| 2014/0063666 A1 | 3/2014 | Kallal et al. |
| 2014/0091634 A1 | 4/2014 | Mayo et al. |
| 2015/0084577 A1 | 3/2015 | Schuessler et al. |
| 2015/0274023 A1 | 10/2015 | Houivet et al. |
| 2015/0372493 A1 | 12/2015 | Sankar |
| 2016/0250932 A1 | 9/2016 | Keeling et al. |
| 2017/0217325 A1 | 8/2017 | Debaun |
| 2019/0006836 A1 | 1/2019 | Danilovic et al. |
| 2019/0006885 A1 | 1/2019 | Danilovic |
| 2019/0255966 A1 | 8/2019 | Lee et al. |

OTHER PUBLICATIONS

"International Preliminary Report on Patentability", Application No. PCT/US2019/018410, dated Sep. 3, 2020, 7 pages.
"International Search Report and Written Opinion", PCT Application No. PCT/US2019/018410, dated Apr. 11, 2019, 13 pages.
"Notice of Allowance", U.S. Appl. No. 16/246,253, dated Jan. 22, 2021, 7 pages.
"Notice of Allowance", U.S. Appl. No. 16/246,253, dated Sep. 29, 2020, 7 pages.

FAULT DETECTION AND MONITORING METHODS FOR SAFE OPERATION OF A WEVC SYSTEM

RELATED APPLICATIONS

This application is a continuation of and claims priority to U.S. Utility application Ser. No. 16/246,253 filed on Jan. 11, 2019 which in turn claims the benefit of and priority to U.S. Provisional Appl. Ser. No. 62/632,825 filed on Feb. 20, 2018, the disclosures of which are incorporated herein by reference in their entireties.

FIELD OF TECHNOLOGY

The present disclosure is related generally to wireless power transfer, and more specifically to an inductive power-transfer system, such as a wireless electric vehicle charging (WEVC) system. In particular, the present disclosure relates to fault detection and monitoring methods for safe operation of a wireless electric vehicle charging (WEVC) system. The present disclosure also relates to a method of controlling a wireless electric vehicle charging system based on fault detection in a base-side equipment of the WEVC system that indicates an emergency situation in a vehicle-side equipment of the WEVC system.

BACKGROUND

Wireless power transfer techniques are increasingly being used to transfer power from electrical power sources to a wide range of devices from small hand-held consumer electronics devices such as mobile phones and tablets requiring a few watts of power to electric vehicles requiring kilowatts of power. In addition to the convenience of not having to plug in a device to power it or recharge its batteries, the absence of wires and cables makes for tidier desks and parking spaces, while reducing clutter and trip and shock hazards. Among other ways, power may be transferred wirelessly via a capacitive coupling or an inductive coupling, both of which offer advantages over resistive (e.g., wired) coupling for the purpose of supplying power to a device.

Wireless power-transfer systems can be designed to operate at fixed or variable frequencies. In addition, wireless power-transfer systems can be designed to deliver from a power source to a load anything from a few watts of power to many kilowatts across a gap between plates of a capacitor or through magnetic coupling between coils. Typically, the gap is an air gap. The energy thus delivered may be used e.g., to power an electronics circuit, to drive an electric motor in an electric vehicle or to charge batteries in the electronics circuit or vehicle. Powering a cell phone or charging its battery requires a few watts, whereas powering the motor in an electric vehicle or charging the battery requires kilowatts. The larger the battery circuit or motor, or the faster the battery is required to charge, the more power is needed to be transferred across the air gap.

Wireless power transfer techniques have developed in different fields of technology which has resulted in different terms being used to describe essentially the same element or component. Such terms as 'magnetic resonance,' 'magnetic coupling,' 'magnetic induction,' 'inductive power transfer' and 'resonant inductive power transfer' are common. Although there are differences, these terms are generally used broadly and interchangeably to refer to systems that transfer power from a source across an air gap to a load by way of a magnetic field.

Similarly, such terms as 'magnetic coils', 'induction coils' and 'antennas' are used essentially interchangeably to describe the parts of a wireless power system that transfer energy across the air gap.

Wireless power transfer systems may use magnetic coils either alone or coupled with other tuned or tunable elements. In electric vehicle power transfer applications, a base power-transfer apparatus may include a coil in combination with associated driving electronics or it may include the coil with some or all the associated electronics being provide in a separate enclosure. Either way, the coil in the base power-transfer apparatus is used to transmit power via a magnetic field. Similarly, a vehicle pad may include the coil in combination with associated control electronics or it may include the coil with some or all the associated electronics being provide in the separate enclosure. Either way, the coil in the vehicle pad is used to receive power via the magnetic field.

The term 'power-transfer apparatus' is also used herein in a variety of different ways. It is used to identify an enclosure including the coil, e.g., the 'base power-transfer apparatus' or the 'vehicle power-transfer apparatus.' It is also used to identify the coil itself.

SUMMARY

Systems and methods are described for fault detection and monitoring methods for safe operation of a wireless electric vehicle charging (WEVC) system. The system may include a base power-transfer apparatus, a vehicle power-transfer apparatus, or a wireless power-transfer system. The methods include a method of controlling a wireless electric vehicle charging system based on monitoring a base-side equipment for an indication of an emergency situation (e.g., fault condition) at a vehicle-side equipment of the WEVC system. The base-side equipment is commonly located on the ground or as the primary side for an entity that delivers power to the electric vehicle for charging. The vehicle-side equipment is located on an electric vehicle and is commonly implemented as the secondary side that receives power for charging the electric vehicle.

Aspects include a wireless electric vehicle charging system that comprises base-side equipment for generating a magnetic field and vehicle-side equipment for receiving energy via the magnetic field to supply power to a vehicle-driving battery. A monitor monitors one or more of voltage, current, or phase associated with the base-side equipment and halts generation of the magnetic field in response to a change in the one or more of the voltage, current, or phase associated with the operation of the base-side equipment that indicates an emergency situation at the vehicle-side equipment. The emergency situation can include a loss of power or a disconnection of the vehicle-driving battery.

In at least one aspect, a method of controlling operation of a wireless electric vehicle charging system is disclosed. The method includes generating a magnetic field by base-side equipment of the wireless electric vehicle charging system to transfer power to vehicle-side equipment of the wireless electric vehicle charging system. The method also includes monitoring one or more of voltage, current, or phase associated with operation of the base-side equipment during power transfer from the base-side equipment to the vehicle-side equipment. In addition, the method includes detecting a change in the one or more of the voltage, current, or phase indicative of an emergency situation in the vehicle-side equipment. The emergency situation may include a loss of power or a disconnection of a battery of the vehicle-side equipment.

In aspects, a wireless electric vehicle charging (WEVC) system is disclosed. The WEVC system includes base-side equipment, a power-factor-correction circuit, tuning circuitry, and monitoring circuitry. The base-side equipment includes a coil. The power-factor-correction circuit is configured to receive alternating current (AC) input and provide a direct current (DC) output. The inverter is coupled to the power-factor-correction circuit and configured to use the DC output to provide a power signal. The tuning circuitry is configured to use the power signal to drive the coil with a tuned power signal to generate a magnetic field. In addition, the monitoring circuitry is configured to monitor at least one of voltage, current, or phase associated with signals passing between one or more of the power-factor-correction circuit and a power supply of the AC input, the power-factor-correction circuit and the inverter, the inverter and the tuning circuitry, or the tuning circuitry and the coil, to detect a change indicating an emergency situation occurring at the vehicle-side equipment of an electric vehicle interacting with the magnetic field.

DETAILED DESCRIPTION

The following description is given with reference to a wireless electric vehicle charging (WEVC) system. The system as described is suitable for charging electric vehicles (EV) and plug-in hybrid electric vehicles (PHEV). The WEVC system uses alternating current (AC) magnetic fields to couple power from a base pad to a vehicle pad to charge the vehicle's batteries. The same ideas could also be used in a dynamic wireless power transfer system for vehicles, where power is transferred from equipment in a roadway to a vehicle as the vehicle travels along the roadway. Furthermore, while certain aspects of the following description are given with reference to a WEVC system, the same ideas and concepts may be used in other wireless power transfer systems in other applications, such as for consumer electronics or other lower power applications.

Figure 1:
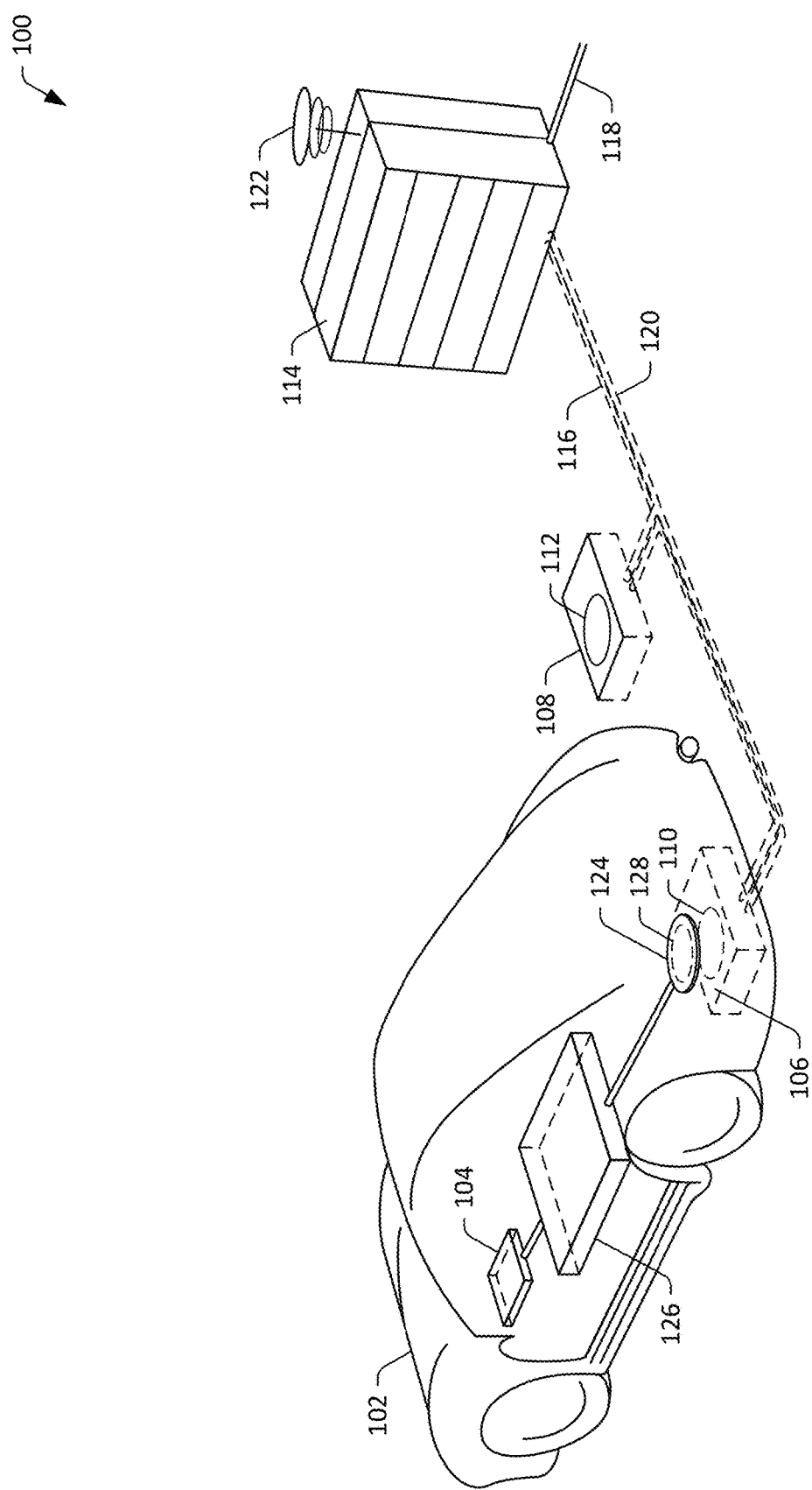
FIG. 1 is a schematic diagram of a wireless power transfer system for charging one or more electric vehicles.

FIG. 1 is a schematic diagram of a wireless power-transfer system 100 for charging one or more electric vehicles. The wireless power-transfer system 100 enables the delivery of power to an electric vehicle 102. Such a system is also known as a wireless electric vehicle charging (WEVC) system because such systems are typically used to deliver power to charge a battery 104 in the electric vehicle 102. The power need not be delivered to the battery 104. Rather, it could be delivered to another load, such as an electric motor or other ancillary in the electric vehicle 102 while it is parked, including a heating system for cold mornings or an air conditioning system for hot days.

As shown, the system 100 allows charging while the electric vehicle 102 is parked in one of two parking spaces which each have an associated base power-transfer apparatus 106, 108. As will be described in greater detail herein after, each base power-transfer apparatus 106, 108 includes a coil 110, 112 which is driven by associated control circuitry (not shown in FIG. 1) to generate a magnetic field above the base power-transfer apparatus 106, 108.

Depending on specific requirements of a given implementation, the control circuitry may be supplied within the base power-transfer apparatus. Alternatively, the control circuitry may be supplied partly or wholly in a unit separate from the base power-transfer apparatus 106, 108, with the base power-transfer apparatus 106, 108 including the coil and minimal base-side control circuitry, if any, that is deemed necessary for efficient driving of the coil 110, 112. The base power-transfer apparatuses 106, 108 are typically installed on the ground surface or buried in the ground, although they may also be supplied as removable units that may simply be placed on the ground where required and moved to another location after use.

A power supply 114 coupled to the base power-transfer apparatuses 106, 108 delivers electrical power to the base power-transfer apparatuses 106, 108 via a power link 116. As shown, the power supply 114 is connected to a power network 118. In a domestic installation, the power supply 114 may be connected to a domestic power supply in place of the power network 118.

In use, the power supply 114 and the base power-transfer apparatus 106, 108 communicate via a communications link 120 which may be a wired or wireless connection. Alternatively, or additionally depending on the specifics of the installation, communication within the system 100 may be via a wireless link 122. The wireless link 122 may optionally also communicate with, e.g., a power grid management system or other external entity via a communication backhaul to manage and control power transfer from the power grid to the system or vice versa. In the illustrated example, the power link 116 and the communications link 120 may be buried. Alternatively, e.g., in a domestic setting, they may be supplied in the form of a cable or umbilicus of connections that can be plugged into the base power-transfer apparatus 106, 108 and the power supply 114.

The electric vehicle 102 includes a vehicle power-transfer apparatus 124 and associated vehicle-side control circuitry 126, which controls the transfer of energy from a coil 128 in the vehicle power-transfer apparatus 124 to the battery 104. The vehicle-side control circuitry 126 and the base-side control circuitry communicate with each other during the transfer of power between the base power-transfer apparatus 106, 108 and the vehicle power-transfer apparatus 124, as will be described in greater detail herein below.

As shown, the vehicle power-transfer apparatus 124 includes the coil 128, and the vehicle-side control circuitry 126 is located in a different location on the vehicle 102 than the coil 128. As with the base power-transfer apparatus 106, 108, this separation of the coil 128 and the control circuitry 126 is a matter of engineering design or selection depending on the specifics of the installation. The control circuitry 126 may be supplied partly or wholly in the vehicle power-transfer apparatus 124 together with the coil 128. In some vehicles it may be more convenient in terms of manufacture or servicing to combine the equipment and the coil 128 in the vehicle power-transfer apparatus 124 whereas, in other vehicles, separate units may be more suitable. Similar considerations apply to the separation or co-location of the control circuitry and the coils 110, 112 in the base power-transfer apparatus 106, 108.

Typically, the vehicle power-transfer apparatus 124 is located under the vehicle 102 near the front or rear of the vehicle 102. The exact location of the vehicle power-transfer apparatus 124 is typically determined when the vehicle 102 is being designed. This determination depends on a wide range of factors associated with the design of the vehicle 102, including the allocation of space to different functional units within the vehicle 102 that may have nothing to do with the WEVC function per se. The position may also depend on the physical size of the vehicle power-transfer apparatus 124, which depends on the amount of energy that the power-transfer apparatus is required to handle. This, in turn, is dependent to some extent on whether the vehicle is a hybrid electric vehicle with both a battery-powered motor and an internal combustion engine, or a (fully) electric vehicle where the only power source is electrical. Conveniently, the vehicle power-transfer apparatus 124 is placed on the vehicle 102 underneath and toward the front or rear of the vehicle 102 to facilitate positioning of the vehicle power-transfer apparatus 124 over the base power-transfer apparatus 106, or over the base power-transfer apparatus 108, during parking of the vehicle 102.

In use, the vehicle 102 is so positioned in a parking space that the vehicle power-transfer apparatus 124 is located over the base power-transfer apparatus 106, 108 in the parking space. When the vehicle 102 is parked as shown, with the vehicle power-transfer apparatus 124 placed over the base power-transfer apparatus 106, 108, wireless power transfer can be employed. Electrical energy in the form of an alternating current is delivered from the power supply 114 via the power link 116 to the base power-transfer apparatus 106 where it drives the coil 110. This current causes the coil 110 to create a magnetic field (Ampere's law). That field induces a voltage (Faraday's law) and an electric current in the coil 128 in the vehicle power-transfer apparatus 124, which current is used to drive a load. The current is converted into a suitable form by the control circuitry 126 and used to charge the battery 104.

It should be appreciated that the system 100 shown in FIG. 1 is a static WEVC system in that the vehicle 102, once parked, remains in place over the base power-transfer apparatus 106, 108 during charging of the battery 104. Other wireless power-transfer systems for electric vehicles allow power transfer to occur while the vehicle is being driven along a road, picking up energy from a charging track that serves a similar function to the base power-transfer apparatus 106, 108.

Usually the wireless power-transfer system 100 is designed to transfer power from the power supply 114 via the power network 118 to the base power-transfer apparatus 106 or 108, and on to the vehicle power-transfer apparatus 124. However, because of the inherent way in which magnetic wireless power-transfer functions, power could also be transferred from the battery in the vehicle to the power network 118. Further description of the operation of the wireless power-transfer system 100 focuses on power transfer from the power supply 114 to the electric vehicle 102. It should, however, be noted while considering the following description that power transfer may also happen in the reverse direction. That is to say, power may be delivered from the battery 104 in the electric vehicle 102 via the wireless power transfer units to the power supply 114 and out to the power network 118.

Figure 2:
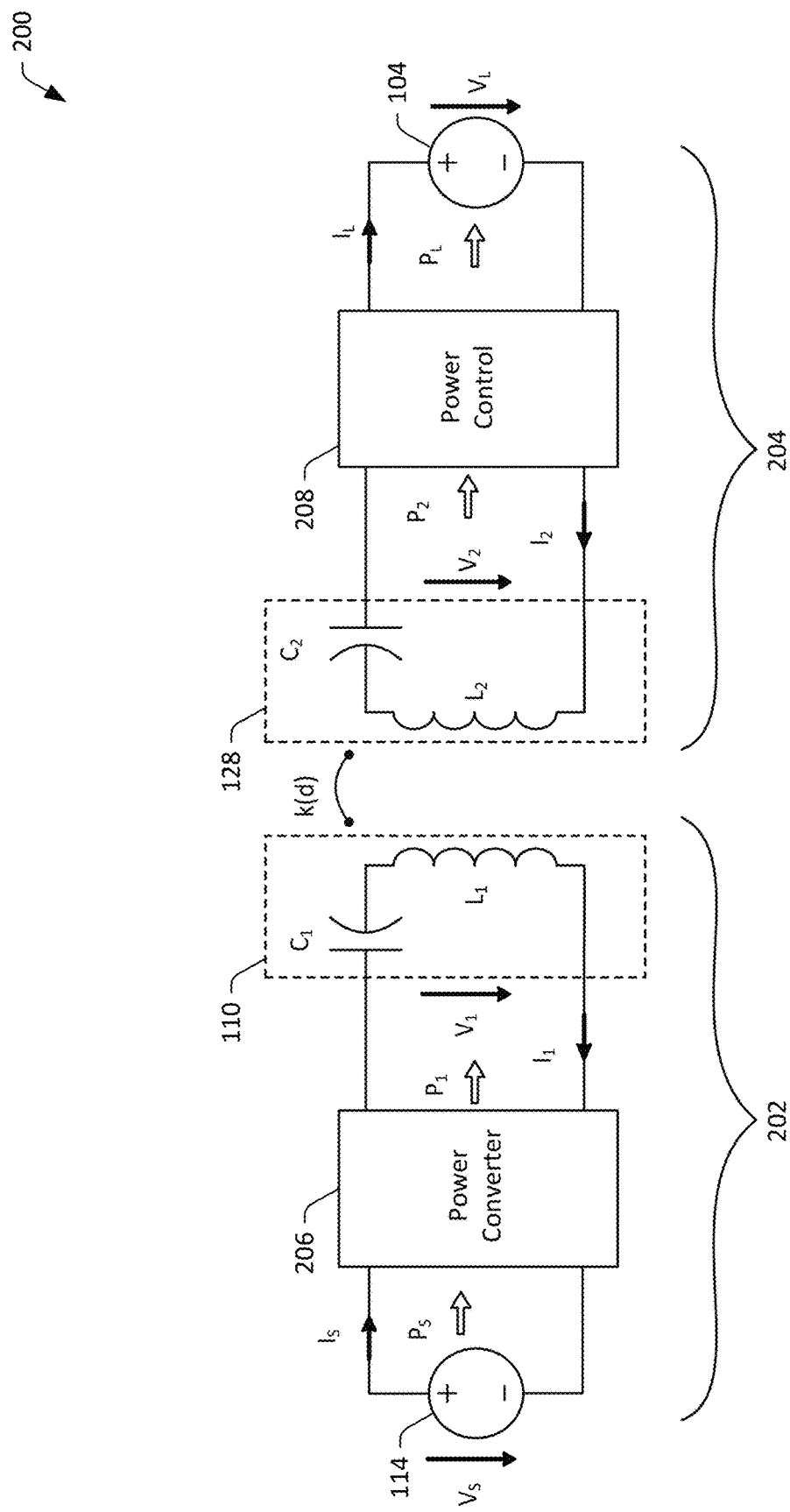
FIG. 2 is a schematic diagram showing at a high level the electrical elements of a wireless power transfer system.

FIG. 2 is a schematic diagram of electrical elements of the wireless power-transfer system of FIG. 1. Electrically, the wireless power-transfer system (now renumbered as 200) comprises base-side circuitry 202 from the power supply 114 to the base-side coil 110, and vehicle-side circuitry 204 from the vehicle-side coil 128 to a load (e.g., the battery 104). The base-side circuitry 202 operates to convert energy from the power supply 114 into a suitable form to drive the base-side coil 110. The vehicle-side circuitry 204 operates to control the application of energy received by the vehicle-side coil 128 to the vehicle's battery 104.

Electrically, the base-side coil 110 is represented by inductor $L_1$ and capacitor $C_1$. The capacitor $C_1$ in series with the coil $L_1$ (as shown) or in parallel (or another mix of parallel and series components) creates an LC circuit that resonates at a given frequency. This resonance helps to optimize power transfer between the coils. Values of L and C are selected with the operating frequency of the WEVC system in mind. Similarly, the vehicle-side coil 128 is represented by inductor $L_2$ and capacitor $C_2$ with values again chosen, among other things, to achieve resonance at the operating frequency.

The power supply 114 supplies AC power $P_s$ to a power converter 206. The AC power may be supplied at local power grid voltage levels $V_s$ (e.g., domestic levels of 110 V or 220 V at 60 Hz in the US and 220 V at 50 Hz in Europe, or industrial levels and polyphase supplies for higher power implementations). The power converter 206 converts the incoming alternating current (AC) power to a power signal $P_1$ running at a system voltage $V_1$ and frequency to drive the base-side coil 110. This may be achieved by first converting the signal from the power supply $P_s$ into a direct current (DC) signal and then using a converter such as an H-bridge (not shown) to convert the DC signal into the power signal $P_1$ for the coil 110. Currently, WEVC systems are being standardized at a range of operating frequencies around ~85 kHz. In one proposed Standard the permitted range is from 81.38 kHz to 90 kHz. Defining a range allows the system to operate at different frequencies depending on different alignment conditions, helping reduce detuning effects and hence improving system efficiency.

The power converter 206 ensures that the output power signal $P_1$ is tuned and matched to the base-side coil 110. Among other things this tuning and matching aims to optimize the efficiency at which power is transferred from the power supply 114 to the base-side coil 110. The power signal has an associated current $I_1$ that flows in the coil 110. This current $I_1$ causes the coil to create a magnetic field.

In use, when the base-side coil 110 and the vehicle-side coil 128 are in close proximity (e.g., the electric vehicle is parked with the coils 110, 128 aligned and separated by an air gap of distance d) the magnetic field generated by the base-side coil 110 couples with the vehicle-side coil 128, as represented by k(d), the coupling factor at distance d. The magnetic field induces a voltage $V_2$ in the coil in the vehicle power-transfer apparatus 124 which creates a power signal $P_2$ including a current $I_2$. The current $I_2$ in the power signal $P_2$ is received by a vehicle-side power control 208, which includes tuning and matching circuitry and power conversion circuitry that converts the current $I_2$ into a form suitable for the battery 104, e.g., DC current.

Different applications of wireless power transfer are designed to fulfill different operating conditions. Whether the operating frequency of the system 200 is chosen first and values of the capacitor $C_1$ and the inductor $L_1$ are selected accordingly, or whether the values of the capacitor $C_1$ and the inductor $L_1$ are chosen first and the operating frequency is selected accordingly is, in practice, an engineering decision.

Although the coil is primarily an inductor L, it is made from a conductor that has an inherent resistance and inter-strand capacitance, with the turns of the coil also creating inter-turn capacitance. These inherent characteristics of the conductor contribute to the values of L and C in the base- and vehicle-side coils 110, 128. In some circumstances, the inherent capacitance may be sufficient to provide the required capacitance without the need for separate components or elements. In other design situations, separate capacitors or other discrete components may prove necessary.

Depending on the market, the equipment for the vehicle 102 (e.g., the vehicle power-transfer apparatus 124 and the vehicle-side control circuitry 126) and the equipment for the base (e.g., the base power-transfer apparatus 106, the coil 110, and the power supply 114) may be made and sold by different vendors to different customers. The vehicle equipment may be sold to automobile manufacturers for incorporation into the mass-production of an electric vehicle. Or, it may be sold directly to electric vehicle owners as an after-market option. Similarly, the base equipment may be supplied to automobile manufacturers for sale with a new electric vehicle or it may be made and sold directly to electric vehicle owners. Ongoing standardization efforts are directed, among other things, to ensuring interoperability of differently designed WEVC systems. The aim is for a vehicle from any automobile manufacturer to be able to work with base equipment from any other supplier, be they automobile manufacturers or others. These factors too need to be considered when designing a WEVC system for sale to customers.

Figure 3:
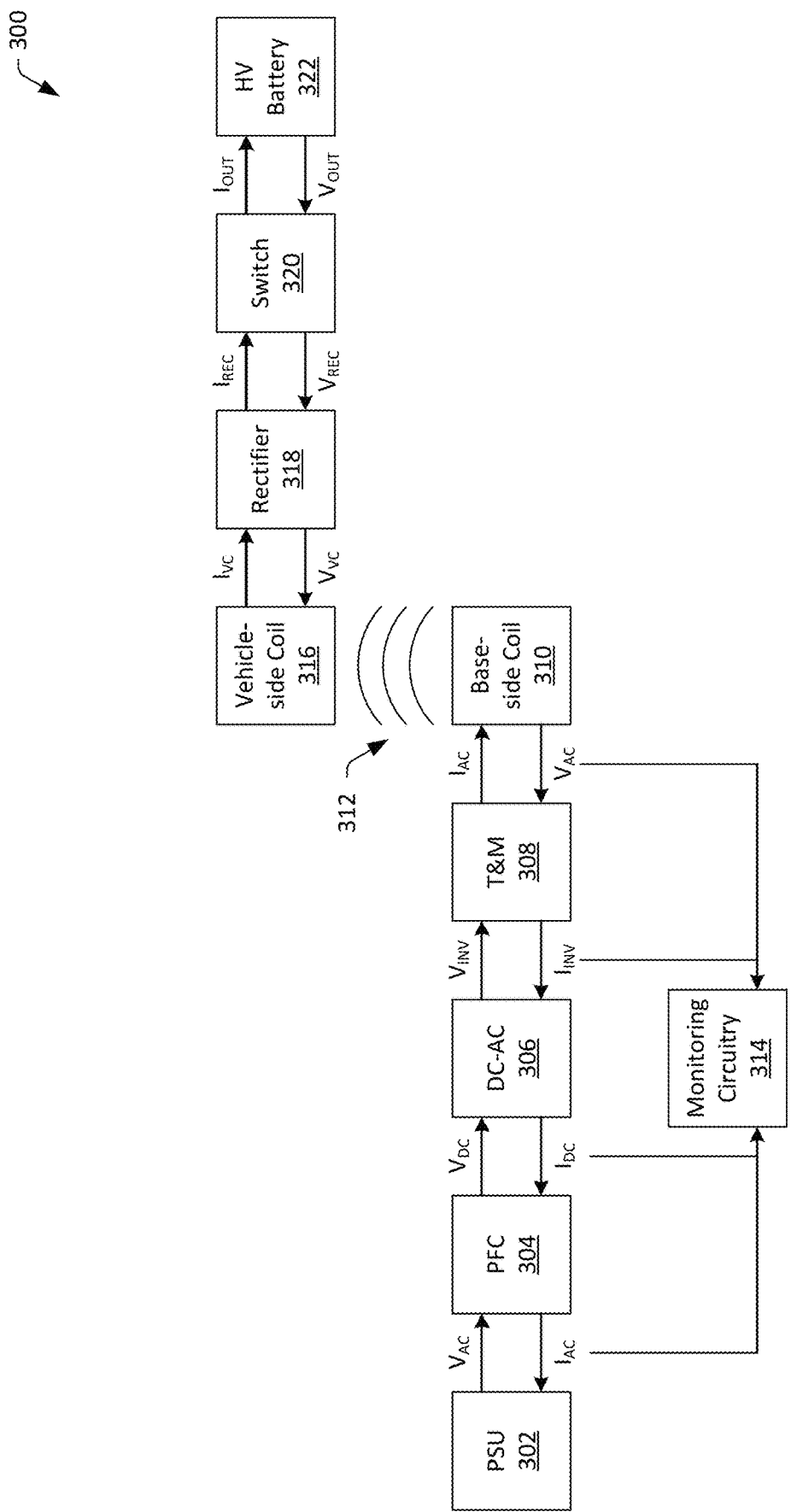
FIG. 3 is a schematic diagram showing in greater detail functional elements of an inductive power transfer system.

Turning now to FIG. 3, the wireless power transfer system shown in FIGS. 1 and 2 is shown in block-diagram form representing some of the functional elements thereof. The system 300 is coupled to a power supply unit (PSU) 302 that delivers power to a power-factor-correction circuit (PFC) 304, as represented by the voltage $V_{AC}$ and current $I_{AC}$ between the PSU 302 and the PFC 304. The PSU 302 may be a connection to a domestic 220-240V AC mains outlet, a more powerful 3-phase AC supply, or similar. The type of power supply is at least to some extent dependent on the power rating of the system (e.g., 3 kW, 6 kW, 11 kW, and so on). The power-factor-correction circuit (PFC) 304 uses the AC input to provide DC power to a DC-AC inverter 306 as represented by voltage $V_{DC}$ and current $I_{DC}$.

The DC-AC inverter 306 is coupled to the PFC 304 and receives the DC power output by the PFC 304. The DC-AC inverter 306 serves to create a high frequency output (e.g., power signal) at the aforementioned operating frequency of the system, e.g., 85 kHz, as represented by the voltage $V_{INV}$ and current $I_{INV}$. The 85 kHz power signal is used as input by tuning and magnetics circuitry (T&M) 308 (also referred to herein as "tuning circuitry") to drive a base-side coil 310 (e.g., as represented by current $I_{AC}$ and voltage $V_{AC}$) with an output power signal to generate a magnetic field 312. Together the PFC 304, the inverter 306, the tuning and magnetics circuitry 308 and the base-side coil 310 comprise the base-side equipment (e.g., supply) of the system 300.

Monitoring circuitry 314 is also provided to monitor the voltages and/or currents passing at various locations between the above-described power supply unit 302 and the base-side coil 310, such as through integrated sensing circuitry. As will be described in greater detail herein below, the monitoring circuitry 314 monitors for changes in the base-side equipment indicative of an emergency situation in the vehicle-side equipment. The monitoring circuitry 314 may include or be implemented with processor hardware logic components, such as, and without limitation, processors, microprocessors, Field-Programmable Gate Arrays (FPGAs), Application-Specific Integrated Circuits (ASICs), Application-Specific Standard Products (ASSPs), System-on-a-Chip systems (SoCs), Complex Programmable Logic Devices (CPLDs), and the like, with memory storing executable instructions for performing operations such as those described herein.

The magnetic field 312 is coupled to by a vehicle-side coil 316, causing a voltage to be induced therein. The induced voltage is used to deliver energy, as represented by the current $I_{VC}$ and voltage $V_{VC}$, to a rectifier 318, which together with a switch controller (Switch) 320, converts the voltage and current into a form suitable for supplying power to charge a high voltage (HV) battery 322. It is this high voltage battery 322 that is used to supply power to drive the electric vehicle 102. Although not shown in the diagram, the battery 322 comprises control circuitry that manages the delivery of energy from the switch controller 320 to the battery 322. The vehicle-side coil 316, the rectifier 318, and the switch controller 320 together form the vehicle-side equipment of the system 300.

Figure 4:
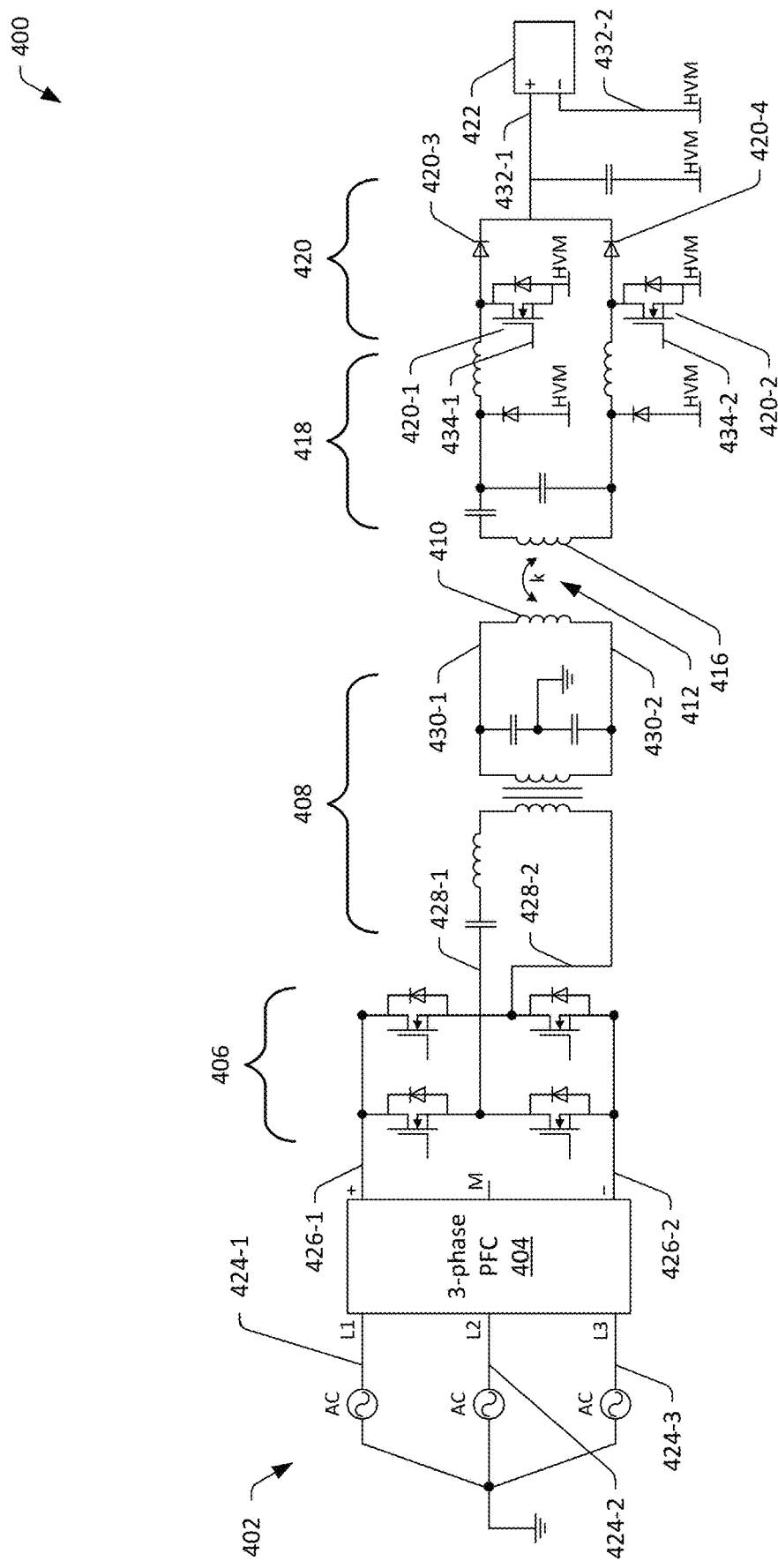
FIG. 4 shows at component level some of the elements of an inductive power transfer system.

FIG. 4 illustrates a system 400 with some of the components of the system 300. The various switching and power electronics components shown in FIG. 4 are, naturally, rated to be able to handle the power passing through them. The selection of components is dependent on the power rating of the system (e.g., 3 kW, 6 kW, 11 kW, etc.) including the ability of the components to handle any losses.

In FIG. 4, the power supply 402 is shown as a 3-phase supply coupled to a power-factor-correction circuit (PFC) 404 which serves to drive an H-bridge inverter 406 comprising, e.g., field-effect transistor (FET) switches and diodes, or similar. The AC output from the H-bridge inverter 406 drives tuning and magnetics circuitry 408 comprising various reactive components configured to condition the output signal from the H-bridge inverter 406 into a form suitable for driving the inductor (coil) 410 corresponding to the base-side coil 310 in FIG. 3.

The magnetic field 412 produced by the inductor (coil) 410 energizes an inductor (coil) 416 corresponding to the vehicle-side coil 316 FIG. 3. This induces a voltage and current in the coil 416 that is delivered to a rectifier circuit 418, which converts the current to a DC current. The current passes through switching circuitry 420, which is shown in FIG. 4 as comprising FET transistors 420-1 and 420-2 that perform the switching function. Other switches can also be used. Diodes 420-3 and 420-4 provide paths from the rectifier circuit 418 to a battery 422, such as the HV battery 322 in FIG. 3. When the transistors 420-1 and 420-2 are activated, the transistors 420-1 and 420-2 short the rectifier circuit 418 and therefore the coil 410, and the diodes 420-3 and 420-4 prevent any current flowing to the battery 422. The switching circuitry 420 thus serves to control the flow of energy from the vehicle-side equipment to the battery 422 by decoupling the coil 416 from the battery 422. It can be appreciated by those skilled in the art that circuit configuration shown here is merely one of many different ways in which decoupling may be achieved.

Points 424-430 in the system 400 represent points at which signals may be monitored for behavior indicative of an emergency situation in the vehicle-side equipment. Points 432-1 and 432-2 indicate a position in the circuit where any changes in operation of the battery 422 can be detected. Points 434-1 and 434-2 indicate points where a control signal is applied to the FET transistors 420-1 and 420-2 to change them between 'open' and 'closed' states.

While the battery 422 is shown as part of the system 400, it may be built into the vehicle during manufacturing. The battery 422 is a unit that includes, in addition to the battery 422 itself, various control circuitry (not shown) that monitors operation of the battery 422 and controls its charging. This includes safety circuitry comprising circuit breakers, switches, or the like, operable to protect the battery 422 under specified circumstances. For example, the safety circuitry may be configured to disconnect or isolate the battery 422 from the WEVC system and from other electrical elements in the vehicle 102 when a fault is detected.

Typically, such batteries are supplied to vehicle manufacturers by specialist companies to a specification defined by the vehicle manufacturer. From the perspective of the system 400 design, the battery 422 is a 'black box' into which the vehicle-side equipment is required to supply energy, e.g., in the form of current flowing into the battery 422. The system 400 does not control this isolation of the battery 422, but it does have to respond to such a disconnect as an emergency situation.

For various reasons, much of the ancillary equipment in a vehicle is designed to be powered from a low voltage supply. Traditionally, this power was supplied from a combination of a 12-volt lead-acid battery and an alternator driven by an internal combustion engine. Some vehicles are now using higher 48-volt batteries. Ancillary equipment includes such things as power steering, lights, and instrumentation and entertainment systems, all of which may be present in an electric vehicle. Accordingly, a 12-volt (V) supply in an electric vehicle may be beneficial. The 12-V supply may be provided by a battery separate from the battery 422. In some electric vehicles a low voltage (e.g., 12 V or 48 V) lead-acid or lithium-ion battery is charged from the battery 422 via a DC-DC converter. The provision of a 12-V battery may also be desirable for safety reasons, e.g., a sudden change resulting in the battery 422 being disconnected. The 12-V supply may also be employed to provide power to the control circuitry in the vehicle-side system and the control circuitry in the battery 422.

A fault causing the battery 422 to disconnect may occur for reasons entirely outside the operation of the system 400. A fuse elsewhere in the vehicle 102, damage to a cable, or even disconnection of the 12-V battery are some examples of events that may trigger HV battery isolation. When this happens, the system 400 is able to shut down quickly to stop energy transfer. With no load (e.g., the battery 422), transferred energy can quickly cause damage to the system 400 itself or to the vehicle's electrical and electronics systems. Although such events are unlikely and rare, they have the potential to cause significant and expensive damage to the battery 422 and/or other ancillary systems powered by the battery 422, e.g., a cabin heater. They must therefore be treated as emergency situations that are handled without delay. Operation of both the vehicle-side and the base-side equipment needs to be stopped quickly.

As mentioned above in relation to FIG. 1, the system comprises control circuitry in both the base-side and the vehicle-side, which enables both sides to communicate with each other during the transfer of power. Among other things, this helps to ensure that the coil in base-side is only energized when the vehicle-side coil is suitably positioned and that energy is transferred efficiently.

There are currently several WEVC Standards under development that specify operation of the system and, to some extent, the way in which it should be constructed. The first priority is to protect the vehicle. Next is to avoid over-voltages and hardware damage within the charging system.

Wi-Fi or other wireless technology may be used for communication between the two sides of the system. However, Wi-Fi communication may not always be guaranteed for safety purposes because of characteristics of a Wi-Fi communication channel that may have some issues with reliability. Thus, sending data, from the vehicle-side equipment to the base-side equipment, indicating an emergency situation may not result in the base-side equipment being stopped sufficiently quickly. Moreover, where the emergency event is triggered by interruption or removal of the 12-V supply, this could render the Wi-Fi elements inoperable. Accordingly, it may be beneficial to include an additional or alternative way of shutting down the system under emergency situations independent of the Wi-Fi or other communication channel in the system.

Even under an emergency situation, there may remain sufficient energy in the control elements of the system 400, e.g., held in the capacitors, to enable the FET transistors 420-1 and 420-2 to close and the diodes 420-3 and 420-4 to stop current being delivered to the battery 422. Normally closed switches could be used to ensure that the power delivery is interrupted by default in the event of the removal of 12-V power from the switching circuitry 420.

The vehicle-side equipment and base-side equipment are coupled to each other via the magnetic field 412 between the base-side inductor coil 410 and the vehicle-side inductor coil 416. A sudden interruption by the switching circuitry 420 causes various effects on the base-side that can be detected. The monitoring circuitry 314 shown in FIG. 3 is arranged to monitor for such changes in the base-side equipment. Detecting one or more of these changes is indicative of an emergency situation in the vehicle-side equipment. A selection of such effects is shown in FIGS. 5-8.

Figure 5:
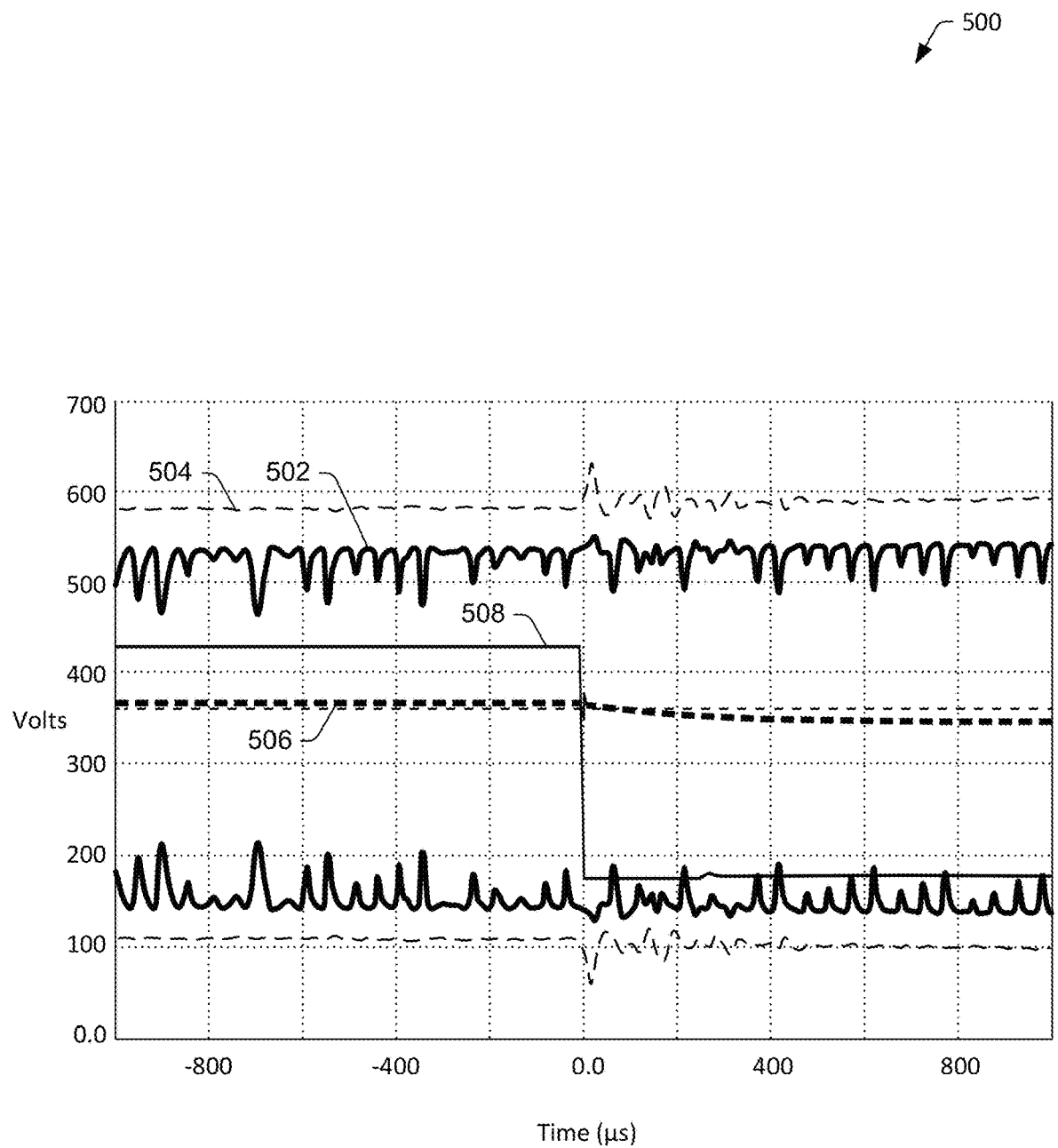
FIG. 5 is a graph representing the voltage and current between tuning and magnetics circuitry and a base pad.

FIG. 5 depicts a graph 500 illustrating a voltage 502 envelope and a current 504 envelope at points 430-1, 430-2 in FIG. 4, e.g., between base-side inductor coil 410 and the tuning and magnetics circuitry (T&M) 408. A sudden change in a root mean square (RMS) value of the voltage 502 may be indicative of a fault condition. A relative change between the current 504 and the voltage 502 may also occur when there is a load drop (e.g., a battery disconnection or a sudden loss of power) or other emergency situation. While monitoring for changes in either of the RMS voltage 502 or the current 504 may provide an indication of an emergency situation at the vehicle-side equipment, an indication with a higher level of confidence may be obtained by monitoring both the RMS voltage 502 and the current 504 and estimating the real power in the coil 410. Output voltage 506 of the vehicle-side coil 316 and output current 508 of the vehicle-side coil 316 are shown to illustrate the relationship between the load drop at the vehicle and the changes in voltage 502, current 504, and/or phase between the base-side inductor coil 410 and the T&M 408.

Figure 6A:
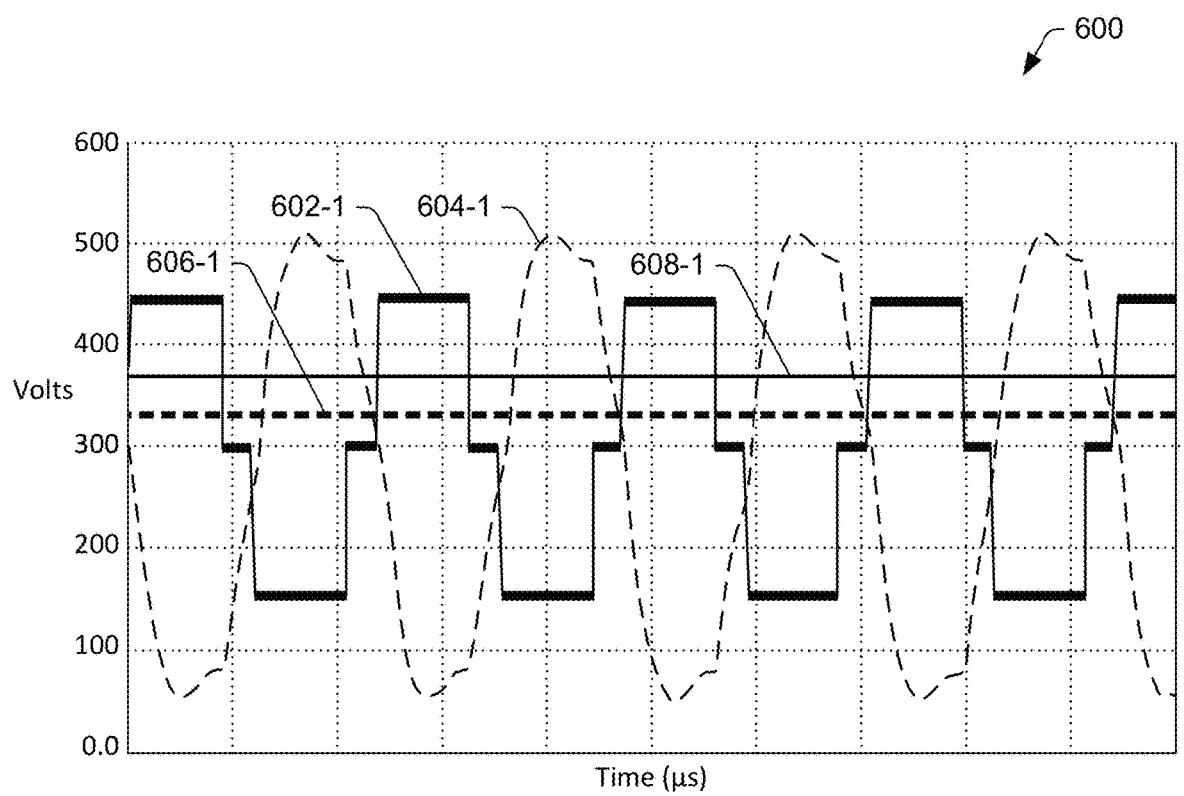
FIG. 6a is a graph representing voltage and current between an inverter and tuning and magnetics circuitry during normal operation.
Figure 6B:
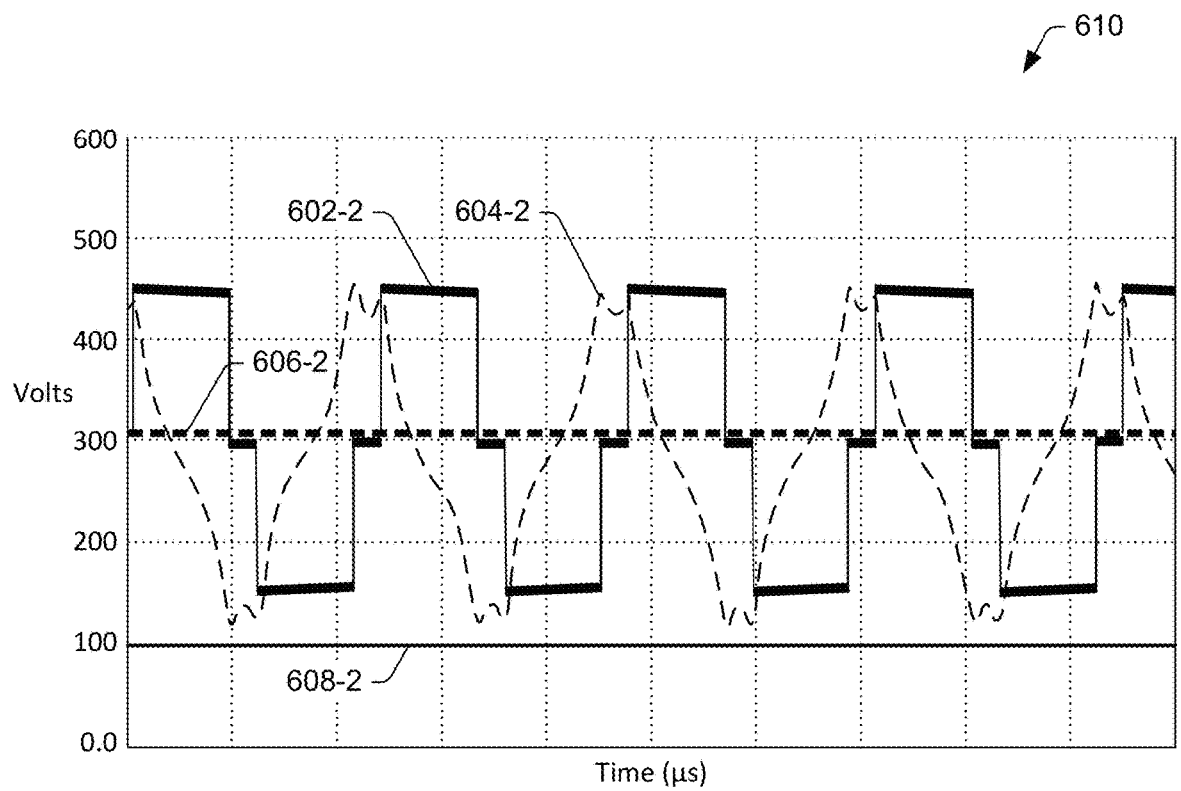
FIG. 6b is a graph representing voltage and current between an inverter and tuning and magnetics circuitry during an emergency situation.

FIG. 6*a* illustrates a graph 600 representing voltage 602-1 and current 604-1 between the tuning and magnetics circuitry 408 and the H-bridge inverter 406 of FIG. 4 during normal operation. The signals represented in graph 600 are measured at the points 428-1 and 428-2 in FIG. 4. In contrast to the normal operation shown in FIG. 6*a*, FIG. 6*b* illustrates a graph 610 representing voltage 602-2 and current 604-2 between the tuning and magnetics circuitry 408 and the H-bridge inverter 406 of FIG. 4 during an emergency situation at the vehicle-side equipment. The voltage 602 is generally a function of the base-side equipment and may not typically represent any changes on the vehicle-side equipment. Harmonics caused by operation of the H-bridge inverter 406 can be seen as noise and should be allowed for in the monitoring. However, a sudden change in the current 604 (e.g., a sudden decrease in the RMS value of the current 604) may indicate a load change or other fault condition. For example, comparing the current 604-1 during normal operation and the current 604-2 during an emergency situation, the RMS value of the current 604-2 drops significantly. While the AC waveform of the voltage 602 remains similar before and during the emergency situation and the peak has merely dropped 10-20%, the overall RMS of the voltage 602 has reduced and some phase shift has occurred. Output voltage 606-1 and output current 608-1 of the vehicle-side equipment during normal operation in FIG. 6*a* and output voltage 606-2 and output current 608-2 of the vehicle-side equipment during an emergency situation in FIG. 6*b* are shown to illustrate the load drop at the vehicle-side equipment and the corresponding relationship with the changes in the voltage 602 and current 604 between the tuning and magnetics circuitry 408 and the H-bridge inverter 406. Again, combining the current 608-2 and the voltage 606-2, and detecting particular characteristic changes in both, to give a power measurement provides an indication of an emergency situation at the vehicle-side equipment with a good level of confidence.

Figure 7:
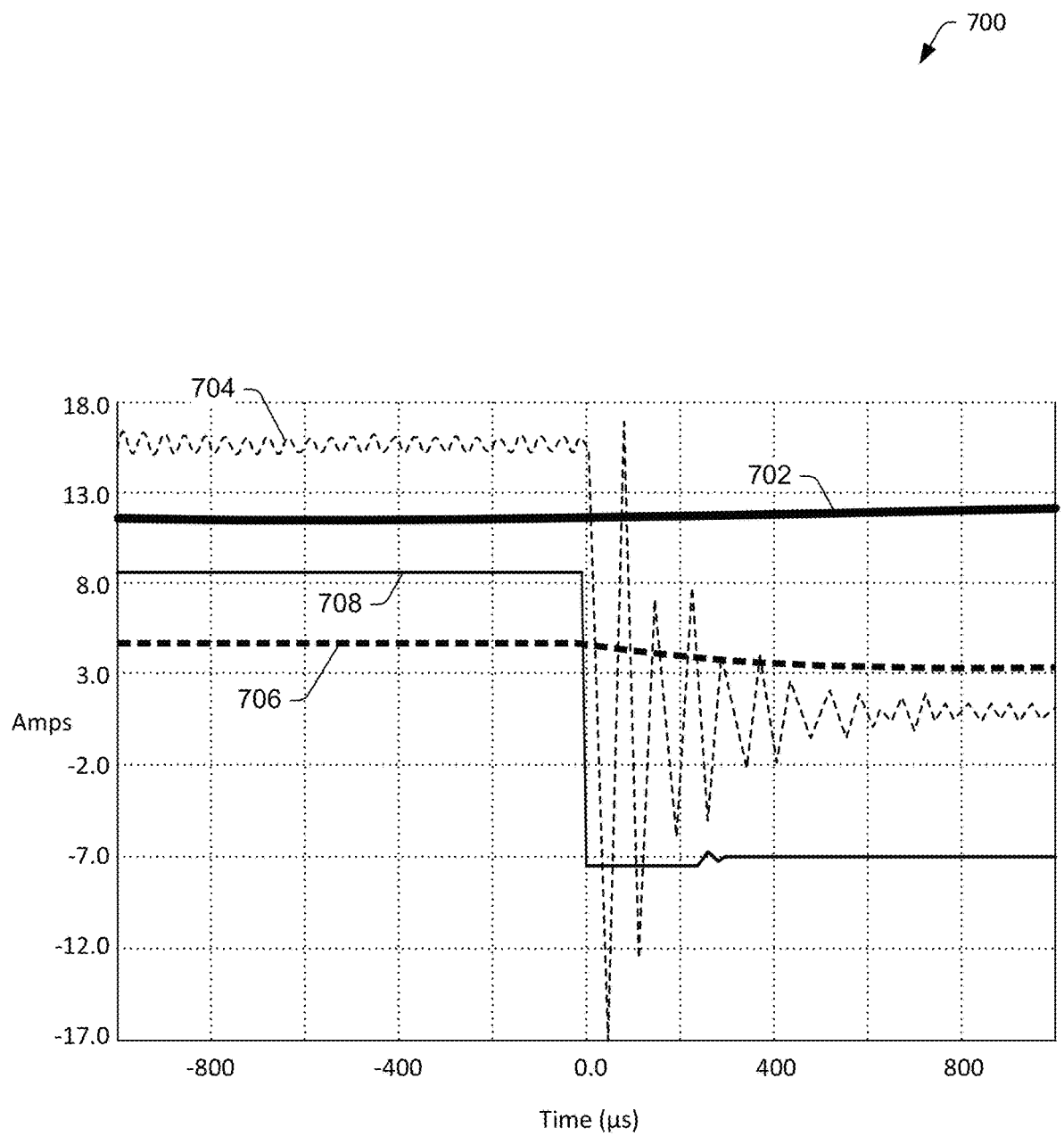
FIG. 7 is a graph representing voltage and current between a power factor correction (PFC) circuit and an inverter.

FIG. 7 illustrates a graph 700 representing DC voltage 702 and current 704 at points 426-1 and 426-2 in FIG. 4, e.g., between the H-bridge inverter 406 and the PFC 404. An emergency situation may be indicated by a sudden unexpected change or drop in the DC voltage 702 and/or current 704 from the PFC 404 to the H-bridge inverter 406. There are several ways in which this may be detected. Oscillation between the resonant network (e.g., the tuning and magnetics circuitry 408, etc.) and the PFC 404 is seen as ringing, particularly in the current 704 signal. This may require averaging to be performed to eliminate any effects of the oscillations. Moreover, there may be noise in the signal to filter out. In addition to simply measuring the DC current, the monitoring circuitry can be configured to look for one or more zero crossings in the current as it changes direction (e.g., from positive to negative or from negative to positive). This reduces the need for filtering and therefore gives a more responsive indication of a fault or other emergency condition at the vehicle-side equipment. Output voltage 706 and output current 708 of the vehicle-side equipment are shown to illustrate the relationship between a load drop at the vehicle 102 and the changes in voltage 702, current 704, and/or phase between the H-bridge inverter 406 and the PFC 404.

Figure 8:
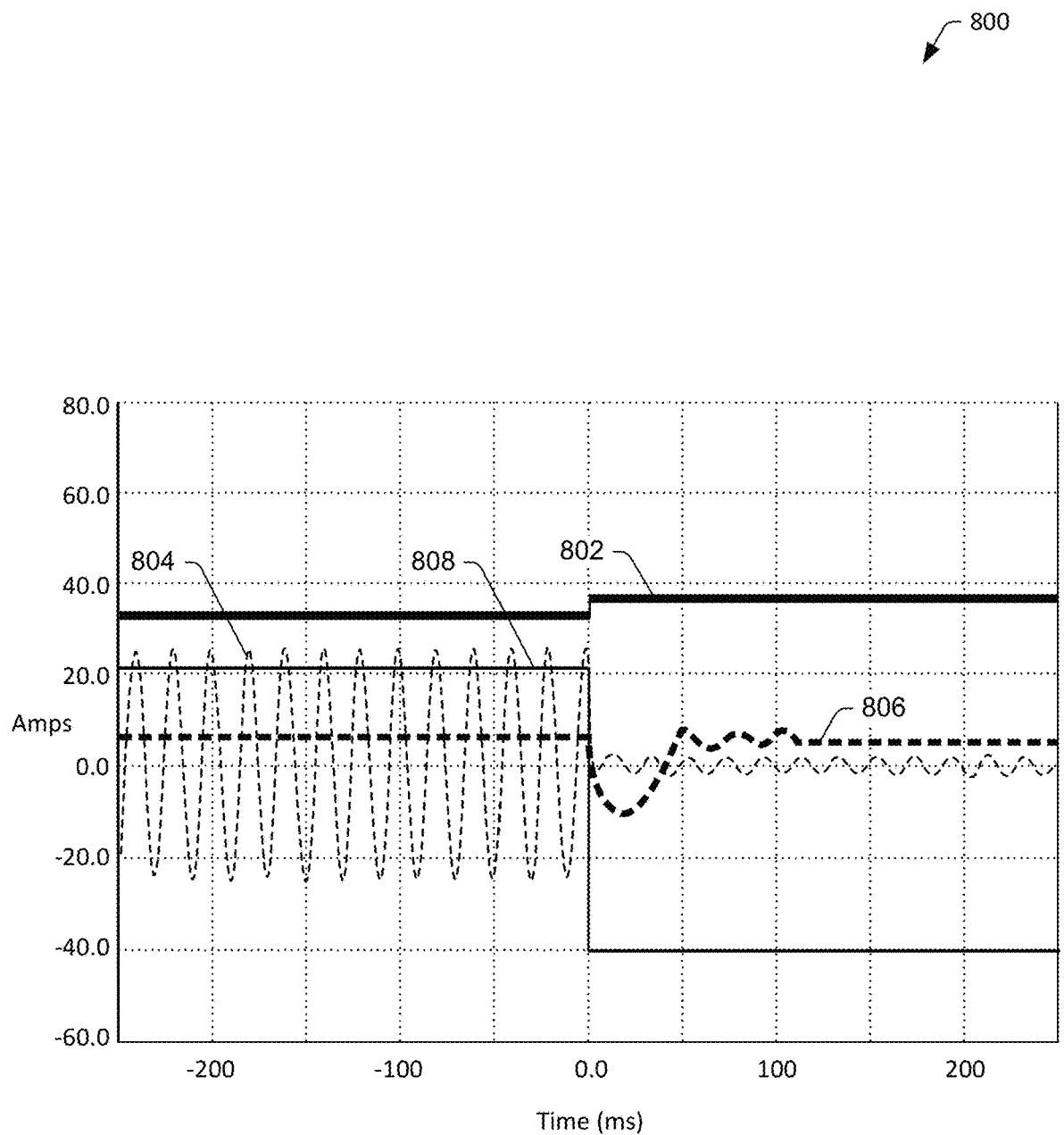
FIG. 8 is a graph representing voltage and current between a power supply and a power-factor-correction circuit.

FIG. 8 illustrates a graph 800 representing voltage 802 and AC current 804 at points 424-1, 424-2, and/or 424-3 in FIG. 4, e.g., between the PFC 404 and the power supply 402. A phase measurement may be obtained from any of the points 424-1, 424-2, and 424-3 between the PFC 404 and the power supply 402. In aspects, two phases can be used to determine the current flow. If all three phases are the same, however, then the system may simply use one phase at one of the points 424-1, 424-2, and 424-3 to determine the current flow. Again, any sudden or unexpected change in current or input power may be an indication of a load disconnect on the vehicle side. This part of the system can operate at mains frequency, e.g., 50 Hz or 60 Hz. Change in the current or input power at the vehicle-side equipment may only be detectable between one cycle and the next, meaning that detection can only be performed every 16-20 ms or some other more limited time range. While this may be slower than some other approaches, it is nevertheless another useful indicator of a fault on the vehicle-side of the system. Output voltage 806 and output current 808 of the vehicle-side equipment are shown to illustrate the relationship between a load drop at the vehicle-side equipment and the changes in the voltage 802, current 804, and/or phase between the PFC 404 and the power supply 402 of the base-side equipment.

In at least some aspects, the AC current 804 input to the PFC 404 can be used in combination with the current 704 input to the H-bridge inverter 406. The current 704 at the H-bridge inverter 406 can be used for determining reliability of the AC current 804 at the PFC 404. By using both the current 704 at the H-bridge inverter 406 and the AC current 804 at the PFC 404, the monitoring circuitry 314 can detect the fault condition at the vehicle-side equipment based on changes in the AC current 804 and/or the current 704.

Although not shown, it can be appreciated by those possessed of the appropriate skills that a sudden change in phase of the voltage and/or the current, or a change in the phase difference between the voltage and current, is another indication of an emergency situation associated with the vehicle-side equipment.

Figure 9:
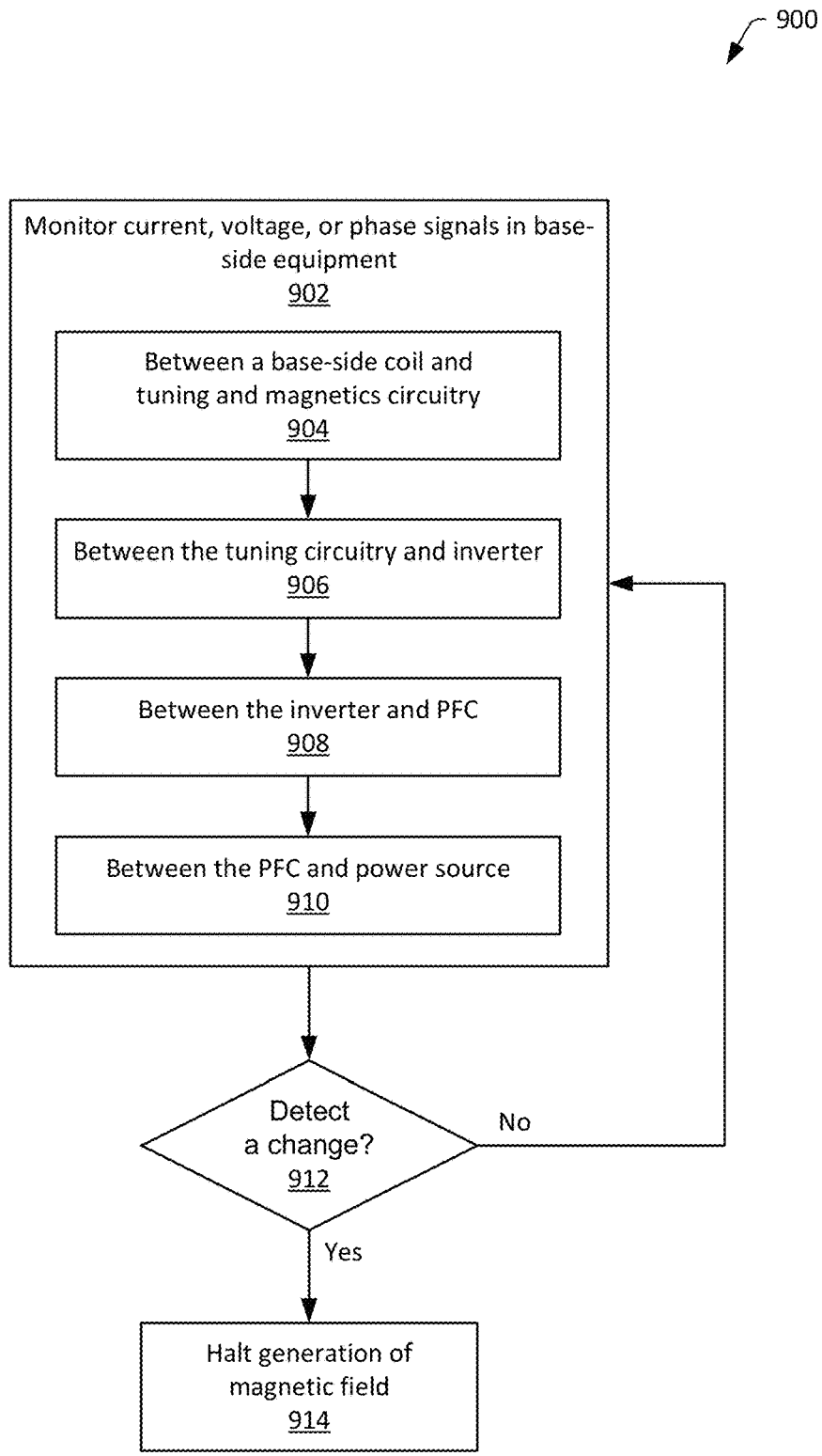
FIG. 9 is a flow diagram of a method of controlling operation of a WEVC system.

FIG. 9 depicts a method 900 of controlling operation of a WEVC system. In aspects, the controlling is based on detecting of an emergency situation at the vehicle-side equipment of the WEVC system. The method 900 can be performed by the monitoring circuitry 314 of FIG. 3.

At 902, the monitoring circuitry 314 monitors signals including at least one of voltage, current, or phase associated with operation of one or more of elements of the base-side equipment of the WEVC system. Power indicators may be determined by combining the voltage and current measurements.

Although the operations 904-910 are shown as being performed sequentially, the operations 904-910 may also be executed individually or in parallel. Depending on the design requirements of a specific power transfer system, any single operation of the operations 904-910, or any a combination of two or more of the operations 904-910, may be performed to determine an emergency situation at the vehicle-side equipment.

At 904, the monitoring circuitry 314 monitors voltage across, and the current in, the base-side coil 310 in the base power-transfer apparatus 106 for an indication of an emergency situation at the vehicle-side equipment. This voltage and current can be measured at points 430-1 and 430-2 of FIG. 4, which are located between the tuning and magnetics circuitry (T&M) 308 and the base-side coil 310. Changes in either of the RMS voltage or the current, or both, provides an indication of an operational error on the vehicle side. Combining the two measurements provides a value of power input to the base-side coil 310.

At 906, the monitoring circuitry 314 monitors voltage, current, and/or phase signals between tuning and magnetics circuitry and an inverter. An example of this is described above with respect to FIG. 6. These measurements can be taken at points 428-1 and 428-2 of FIG. 4, which are located between the tuning and magnetics circuitry 308 and the inverter (DC-AC) 306 of FIG. 3.

At 908, the monitoring circuitry 314 monitors the voltage, current, and/or phase signals between an inverter (DC-AC) and a power-factor-correction circuit (PFC). An example of this is described above with respect to FIG. 7. These measurements can be taken at points 426-1 and 426-2 of FIG. 4, which are located between the inverter (DC-AC) 306 and the PFC 304 of FIG. 3.

At 910, the monitoring circuitry 314 monitors the voltage, current, and/or phase signals between the PFC and a power source. An example of this is described above with respect to FIG. 8. These measurements can be taken at points 424-1 and 424-2 of FIG. 4, which are located between the PFC 304 and the power supply unit 302 of FIG. 3.

At 912, the monitoring circuitry 314 determines if a change in the voltage, current, and/or phase signals at one or more of 904-910 in the base-side equipment is detected. If not, the monitoring circuitry 314 continues monitoring for such changes. However, if a change is detected that is indicative of a sudden loss of power at the vehicle-side equipment, then at 914, the monitoring circuitry 314 determines that an emergency situation has occurred in the vehicle-side equipment and responsively halts generation of the magnetic field. In aspects, the change can include an interruption of the alternating current to the coil.

The effects of a sudden change in operation in the vehicle-side equipment may also occur under other situations that constitute an emergency in which damage could occur if operation of the system were to continue. For example, a sudden change (increase or decrease) in coupling between the base-side coil and the vehicle-side coil, the introduction of a large foreign metallic object between the base-side coil and the vehicle-side coil, or mechanical damage to components in the system (primarily the one or both of base-side coil and the vehicle-side coil) could lead quickly to significant damage to the system. A significant change in the power being requested via the system's Wi-Fi control channel between one request and the next may also be an early indication of an emergency situation.

Figure 10:
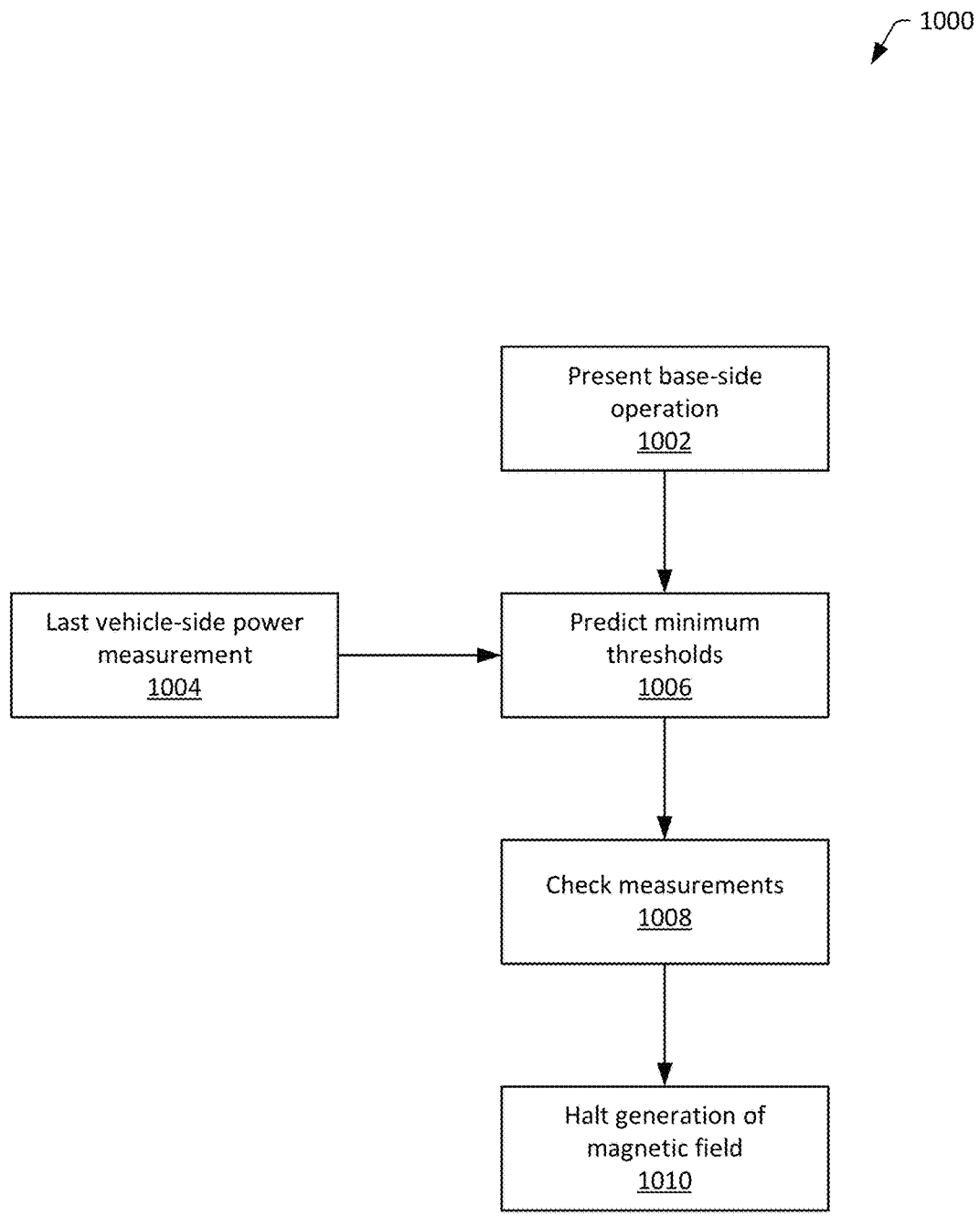
FIG. 10 is a flow diagram showing the use of system measurements as a predictor.

FIG. 10 depicts a flow diagram 1000 showing the use of system measurements as a predictor or early indicator of an emergency situation at vehicle-side equipment of a WEVC system. In aspects, the last known vehicle-side measurement data is used in combination with other monitored signals.

Operation of the base-side equipment is monitored 1002 as described above, e.g., in the method 900 of FIG. 9. Additionally, the monitoring may include data representing present operation of the base-side equipment, such as information on the duty cycle of the inverter 306 and other control information. The vehicle-side equipment sends data 1004 from time-to-time, e.g., approximately every 100 ms, indicating a last vehicle-side power measurement. In aspects, this power measurement can be used to represent an expected operating point of the system. With this information, the monitoring circuitry 314 predicts 1006 minimum thresholds, such as the minimum expected value of other operating data. For example, if the vehicle-side power requirement is known, together with the PFC voltage and the duty cycle, the expected current of the rectifier can be predicted. Naturally, these calculations may be specific to the topology of the system with equations that define the relationships between measured signals. Known performance measurements, e.g., results of measurements obtained at 1002, are checked 1008 against the predicted minimum thresholds. With sufficient data these thresholds may be determined as absolute thresholds.

A significant deviation in the known performance measurements from the predicted minimum thresholds (e.g., a deviation in a known performance value from the expected value that exceeds a threshold value) can be interpreted as an emergency situation. In an example, if a previous (e.g., last known) vehicle-side measurement indicates that 10 kW of power is being received at the vehicle-side equipment, then it is expected that 10 kW of power will continue to be delivered from the base-side equipment. If, suddenly there is only 2 kW of power being delivered to the vehicle-side equipment, then it is concluded that an emergency situation has occurred at the vehicle-side equipment that has caused a loss of power. This is because the voltage, current, or phase signals should not ramp or change too quickly. To prevent damage, generation of the magnetic field is halted 1010 (e.g., by interrupting the current in the coil) in response to detection of the deviation. Using the last known vehicle-side power measurement, the system can account for and allow minor natural deviations, such as typical slow ramp up, slow ramp down, slow de-rating, and so on, without triggering a false shutoff condition. These techniques therefore allow the system to determine a size or type of change that is acceptable or that should trigger a shutoff of the magnetic field.

In aspects, the vehicle-side equipment can send power requests to the base-side equipment to request a certain amount of power to be transferred via the magnetic field. The base-side equipment can compare a present power request from the vehicle-side equipment with a previous power request from the vehicle-side equipment to determine differences that may indicate an emergency situation at the vehicle-side equipment. For example, if the 10 kW of power described above corresponds to the previous power request and the 2 kW of power corresponds to the present power request, then the base-side equipment can determine that the sudden and substantial drop in the power request is indicative of an emergency situation at the vehicle-side equipment. Alternatively, the base-side equipment can compare the previous power request with data representing present operation of the base-side equipment to determine whether power levels of the present operation correspond to or substantially deviate from the previous power request (e.g., last received power request).

In an example, the base-side equipment receives a first power request form the vehicle-side equipment requesting a first amount of power to be transferred to the vehicle-side equipment via the magnetic field. The base-side equipment then delivers the requested amount of power via the magnetic field. Subsequently, such as at a next received signal from the vehicle-side equipment (e.g., after about 100 ms), the base-side equipment receives a second power request. This second power request may request a second level of power to be transferred to the vehicle-side equipment via the magnetic field. The base-side equipment then compares the second power request with the first power request to determine whether the emergency situation has occurred at the vehicle-side equipment. If, based on the comparison, the second power request is significantly different (higher or lower) than the first power request, then the base-side equipment can determine that the emergency situation has occurred at the vehicle-side equipment and that the magnetic field should be shut off to prevent damage at the vehicle-side equipment. Sequential power requests that differ by more than a threshold amount, therefore, can be used to indicate the emergency situation at the vehicle-side equipment and trigger an emergency shutoff of the magnetic field.

Unauthorized harvesting of magnetic energy from the magnetic field may cause similar changes and can therefore also be detected using the approaches described herein.

Having described the invention by reference to a wireless electric vehicle charging (WEVC) system, a base power-transfer apparatus for the WEVC system, a method of controlling the WEVC system, and a method of controlling a base power-transfer apparatus for the WEVC system, it is to be understood that the same have been described by way of example only and that modifications and variations such as may occur to those possessed of appropriate knowledge and skills may be made without departure from the spirit and scope of the invention as set forth in the appended claims and equivalents thereof.

What is claimed is:

1. Base-side equipment of a wireless electric vehicle charging system, the base-side equipment comprising:
   an inverter configured to provide a high frequency output;
   tuning circuitry coupled to the inverter, the tuning circuitry configured to receive the high frequency output and provide an output power signal;
   a coil coupled to the tuning circuitry, the coil configured to receive the output power signal and generate a magnetic field for delivery of power to vehicle-side equipment; and
   monitoring circuitry between the inverter and the tuning circuitry, the monitoring circuitry configured to:
      monitor voltage and current associated with operation of the base-side equipment; and
      halt generation of the magnetic field in response to a change in the voltage, current, or voltage and current, that indicates a fault condition at the vehicle-side equipment.

2. The base-side equipment of claim 1, wherein the fault condition is a loss of power or a disconnection of the vehicle-driving battery.

3. The base-side equipment of claim 1, wherein the generation of the magnetic field is halted based on an interruption of the output power signal.

4. The base-side equipment of claim 1, further comprising a power-factor-correction circuit coupled to a power source and configured to provide a direct current (DC) output to the inverter.

5. The base-side equipment of claim 1, wherein:
   the base-side equipment is configured to generate the magnetic field in response to power requests from the vehicle-side equipment; and
   the monitoring circuitry is configured to compare a previous power request from the vehicle-side equipment with data representing present operation of the base-side equipment.

6. The base-side equipment of claim 1, wherein:
   the base-side equipment is configured to generate the magnetic field in response to power requests received from the vehicle-side equipment; and
   the monitoring circuitry is further configured to:
      determine a known performance value associated with the voltage, current, or voltage and current;
      predict an expected value of a second voltage, a second current, or a second voltage and current associated with operation of the vehicle-side equipment based on a combination of a last received power request from the vehicle-side equipment and data representing operation of the base-side equipment; and
      halt the generation of the magnetic field in response to a deviation in the known performance value from the expected value that exceeds a threshold value.

7. The base-side equipment of claim 1, wherein:
   the base-side equipment is configured to generate the magnetic field in response to power requests from the vehicle-side equipment; and
   the monitoring circuitry is configured to compare a present power request from the vehicle-side equipment with a previous power request from the vehicle-side equipment.

8. The base-side equipment of claim 1, wherein the monitoring circuitry is configured to determine the fault condition at the vehicle-side equipment based on a decrease in a value of the current.

9. The base-side equipment of claim 1, wherein the monitoring circuitry is configured to determine the fault condition at the vehicle-side equipment based on a decrease in a value of the voltage.

10. The base-side equipment of claim 1, wherein the monitoring circuitry is configured to determine the fault condition at the vehicle-side equipment based on a decrease in a first root mean square (RMS) value of the current and in a second RMS value of the voltage.

11. A method of controlling operation of a wireless electric vehicle charging system, the method comprising:
    generating a magnetic field by base-side equipment of the wireless electric vehicle charging system to transfer power to vehicle-side equipment of the wireless electric vehicle charging system;
    monitoring a voltage, a current, or a voltage and a current associated with operation of the base-side equipment between tuning circuitry of the base-side equipment and an inverter of the base-side equipment during power transfer from the base-side equipment to the vehicle-side equipment;
    detecting a change in the voltage, the current, or the voltage and a current indicative of a fault condition in the vehicle-side equipment; and
    halting generation of the magnetic field in response to detecting the change.

12. The method of claim 11, wherein the fault condition is a loss of power or a disconnection of the vehicle-driving battery.

13. The method of claim 11, wherein:
    the magnetic field is generated by a coil driven by an alternating current; and
    the halting comprises interrupting the alternating current to the coil.

14. The method of claim 11, further comprising providing a direct current (DC) output to the inverter from a power-factor-correction circuit coupled to a power source.

15. The method of claim 11, wherein:
    the magnetic field is generated based on first data received from the vehicle-side equipment, the first data indicating a previous power measurement of the vehicle-side equipment; and
    the method further comprises comparing the first data with second data representing present operation of the base-side equipment.

16. The method of claim 11, wherein:
    the magnetic field is generated based on first data received from the vehicle-side equipment, the first data indicating a power measurement of the vehicle-side equipment or a power request from the vehicle-side equipment; and
    the method further comprises:

determining a known performance value based on the voltage, the current, or the voltage and current; and predicting an expected value of a second voltage, a second current, or a second voltage and current associated with operation of the vehicle-side equipment based on a combination of the second data representing present operation of the base-side equipment and one of the power measurement of the vehicle-side equipment or the power request received from the vehicle-side equipment; and halting generation of the magnetic field is performed in response to a deviation in a known performance value from the expected value that exceeds a threshold value.

17. The method of claim 11, wherein:

the base-side equipment is configured to generate the magnetic field based on data received from the vehicle-side equipment that indicates vehicle-side power measurements; and the method further comprises:

receiving first data indicating a first power measurement at the vehicle-side equipment;

subsequent to receiving the first data, receiving second data indicating a second power measurement at the vehicle-side equipment; and comparing the second power measurement with the first power measurement to determine whether the fault condition has occurred at the vehicle-side equipment.

18. The method of claim 11, further comprising determining the fault condition at the vehicle-side equipment based on a decrease in a value of the current.

19. The method of claim 11, further comprising determining the fault condition at the vehicle-side equipment based on a decrease in a value of the voltage.

20. The method of claim 11, further comprising determining the fault condition at the vehicle-side equipment based on a decrease in a first root mean square (RMS) value of the current and in a second RMS value of the voltage.

* * * * *